DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 4, 1976

946 O.G. 9

T946,010

PROCESS FOR A ROASTED AND GROUND COFFEE PRODUCT

Arthur Stefanucci, 119 Merrill Road, Clifton, N.J. 07011; Douglas Robert Harnisch, 5800 Arlington Ave., Riverdale, N.Y. 10471; George William Stevens, 54 Cherokee Ave., Allendale, N.J. 07401; and Joseph Francis Coogan III, 320 S. Broadway, Tarrytown, N.Y. 10591

Continuation of abandoned application Ser. No. 432,383, Jan. 10, 1974. This application May 2, 1975, Ser. No. 574,193

Int. Cl. A23f *1/06;* A23l *3/36;* B02c *23/18*

U.S. Cl. 426—418

No Drawing. 5 Pages Specification

Roasted and ground coffee products having improved freshness are prepared by maintaining the coffee material after roasting and until packaging under conditions of low oxygen and moisture contact. The beans are maintained at reduced temperatures during grinding by means of direct contact with liquid nitrogen. The package roasted and ground product has improved freshness both in terms of shelf-like stability and in-use freshness.